United States Patent [19]

Hara

[11] Patent Number: 5,746,534
[45] Date of Patent: May 5, 1998

[54] CLIP FOR WINDSHIELD WIPER BLADE

[75] Inventor: Masami Hara, Toyohashi, Japan

[73] Assignee: ASMO Co., Ltd., Kosai, Japan

[21] Appl. No.: 760,310

[22] Filed: Dec. 4, 1996

[30] Foreign Application Priority Data

Apr. 5, 1996 [JP] Japan .................................. 8-083927

[51] Int. Cl.⁶ .................................................. B60S 1/40
[52] U.S. Cl. ...................... 403/133; 403/329; 403/405.1; 15/250.32
[58] Field of Search .......................... 15/250.32, 250.31, 15/250.33, 250.44, 250.351; 403/329, 24, 405.1, 133, 150

[56] References Cited

U.S. PATENT DOCUMENTS

| 4,290,164 | 9/1981 | van den Berg | 15/250.32 |
| 4,967,438 | 11/1990 | Arai et al. | 15/250.32 |
| 5,289,608 | 3/1994 | Kim | 15/250.32 |
| 5,383,248 | 1/1995 | Ho | 15/250.32 |

FOREIGN PATENT DOCUMENTS

| 266620 | 11/1968 | Austria | 15/250.33 |
| 2247896 | 5/1975 | France | 15/250.32 |
| 2501135 | 9/1982 | France | 15/250.32 |
| 2128739 | 12/1971 | Germany | 15/250.32 |
| 3619589 | 12/1987 | Germany | 15/250.32 |
| 38 42 955 | 6/1990 | Germany . | |
| 61-47757 | 3/1986 | Japan . | |
| 61-47758 | 3/1986 | Japan . | |
| 4-58472 | 5/1992 | Japan . | |
| 2055560 | 3/1981 | United Kingdom | 15/250.32 |
| 2163043 | 2/1986 | United Kingdom | 15/250.32 |

*Primary Examiner*—Gary K. Graham
*Attorney, Agent, or Firm*—Burns, Doane, Swecker & Mathis, LLP

[57] ABSTRACT

A clip for windshield wiper blade has its shape designed for less occurrence of wobble relative to an arm piece. A penetration hole of the clip is formed in a taper configuration; smallest at a middle portion and largest at both open end portions. A thinned portion is formed around the middle portion by forming a recessed portion at a radially outer periphery of the middle portion. Supporting bars are disposed between a pair of side plates at a position opposite to the connecting bar.

8 Claims, 4 Drawing Sheets

5,746,534

1

CLIP FOR WINDSHIELD WIPER BLADE

CROSS REFERENCE TO RELATED APPLICATIONS

This application is based upon and claims priority from Japanese Patent Application No. 8-83927 filed Apr. 5, 1996, the contents of which are incorporated herein by reference.

BACKGROUND OF THE INVENTION

1. Field of the Invention

The present invention generally relates to a shape of a clip for a windshield wiper blade. The clip is used for joining an arm piece to a windshield wiper blade.

2. Related Art

Generally, a clip, as shown in FIGS. 10 and 11, is used for attaching a windshield wiper blade to an arm piece of a windshield wiper. This clip 51 is manufactured by injection-molding synthetic resin material. Clip 51 includes a pair of side plates 52 and a connecting bar 53 connecting these side plates 52. Connecting bar 53 has a substantially cylindrical penetrating hole 54 penetrating clip 51 in the width direction. A part of penetrating hole 54 is open along the width direction of clip 51. The diameter of penetrating hole 54 of clip 51 is the smallest at a middle portion 54a thereof and the largest at both end portions 54b as shown in FIG. 11. This configuration of penetrating hole 54 is due to the restrictions on shapes of molding die for injection-molding. That is, to take out a molded product easily after molding process, a convex portion of the molding die for forming the molded product has a tapered configuration so that a parting line (a line contained in the plane at which two dies interface) of the molded product (in this case, the middle portion of penetration hole 54) is narrow. As illustrated in FIG. 12, connecting bar 53 includes an arm piece fixing member 55 formed to extend therefrom. Arm piece fixing member 55 has a protruding portion 56 engaging with the arm piece. Oppositely to connecting bar 53, a supporting bar 57 is formed to connect side plates 52 at an upper portion of side plates. This supporting bar 57 reinforces the structure of clip 51.

A process of attaching a windshield wiper blade to an arm piece using clip 51 will now be described. As illustrated in FIG. 11, clip 51 is inserted into a joint member J in a manner that penetration hole 54 of clip 51 is in alignment with holes P1 and P2 provided in the joint member J which is a part of the blade. Then, a rivet R is inserted into hole P1. The diameter of rivet R is equivalent to the smallest diameter of penetrating hole 54, which is the diameter at the center portion 54a. Rivet R is inserted until its head H reaches blade joint member J. A caulking portion S formed at the tip of rivet R is projected through the hole P2 of blade joint member J. By flattening caulking portion S, clip 51 is attached rotatably around blade joint member J which is a part of the blade. Next, a concave portion formed at a U-shaped tip (not shown) of the arm piece is engaged with protruding portion 56. Therefore, the blade is rotatably installed with respect to the arm piece. Clip 51 is slidably contacted with blade joint member J.

Here, penetrating hole 54 is provided in a manner that its minimum diameter, the diameter at middle portion 54a, corresponds to the outside diameter of rivet R. As illustrated in FIG. 11, a clearance is made between the inner wall of clip insertion hole 54 (penetrating hole) and rivet R when clip 51 is attached by rivet R to blade joint member J which is a part of the blade, resulting in a wobble to the arm piece of blade joint member J. The wobble will become greater when molding dies displace at the parting line.

2

The resin often shrinks when a molded resin product is taken out of the molding die. Clip 51, made of resin, is affected by this characteristic of resin. The influence of the resin shrinkage on clip 51 is apparent at an edge portion opposite to connecting bar 53. That is, due to the resin shrinkage, both side plates 52 are deformed and bent inwardly when the clip of resin is taken out of the molding die. This deformation reduces more greatly the bottom width of clip 51 than the upper width of clip 51 which has the supporting bar 57 only at the upper portion, as illustrated in FIG. 13. Therefore, the sliding area of clip 51 and blade joint member J is reduced. This reduced sliding area causes a wobble between clip 51 and blade joint member J, thereby causing a wobble of the blade to the arm piece. Further, repeated sliding movement of clip 51 and blade joint member J adds to the wobble therebetween.

Those two kinds of wobbles, the wobble between rivet R and penetrating hole 54 and the wobble between side plates 52 and blade joint member J, generate a chatter of a wiper over the windshield of vehicles.

SUMMARY OF THE INVENTION

In the light of the foregoing problems, it is an object of the present invention to provide a clip for windshield wiper blades having its shape effective to suppress wobble at an arm piece of a blade.

According to a first aspect of the invention, a penetrating hole of a connecting bar has a diameter at a middle portion thereof smaller than a diameter at both end portions thereof which corresponds to an outside diameter of a rivet. The connecting bar has a thinned portion at a radially outside of middle portion thereof, so that the diameter of the penetrating hole is widened at the thinned portion to conform to the outside diameter of the rivet throughout the width of the connecting bar when the screw is inserted. Therefore, since the penetrating hole is deformed in a manner that the diameter thereof conforms to the outside diameter of the rivet throughout the width of the connecting bar when the rivet is inserted, no clearance is made between the inner wall of the penetrating hole and the rivet, thus suppressing wobble.

According to a second aspect of the invention, a plurality of supporting bars are formed between a pair of side plates to connect the side plates at positions opposite to the connecting bar. These supporting bars restrain a clip from reducing the width thereof.

According to a third aspect of the invention, a plurality of supporting bars are formed between a pair of side plates at positions opposite to a connecting bar to connect the pair of side plates. A penetrating hole has a diameter at a middle portion thereof smaller than a diameter at both ends which conforms to an outside diameter of a rivet. The connecting bar has a thinned portion at the radial outside of a middle portion thereof, so that the diameter of the penetrating hole is widened at the thinned portion to correspond to the outside diameter of the rivet throughout the width of the connecting bar when the rivet is inserted. Accordingly, a reduction of the width of the clip is restrained and no clearance is made between the inner wall of the penetrating hole and the rivet.

BRIEF DESCRIPTION OF THE DRAWINGS

These and other objects of the present invention along with an understanding of the relationship of the parts forming the present invention and their function will become apparent to one of ordinary skill in the art from a study of the following detailed description, the appended claims and drawings. In the drawings:

DETAILED DESCRIPTION OF THE PRESENTLY PREFERRED EXEMPLARY EMBODIMENTS

The present invention will be described in detail with reference to various embodiments illustrated in the accompanying drawings.

(FIRST EMBODIMENT)

Hereinafter, a first embodiment of the clip according to the present invention will now be described with reference to FIGS. 1 through 7.

Figure 1:
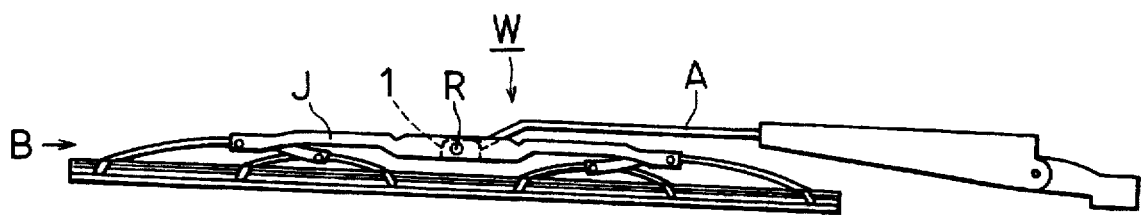
FIG. 1 is a side view illustrating a windshield wiper.
Figure 2:
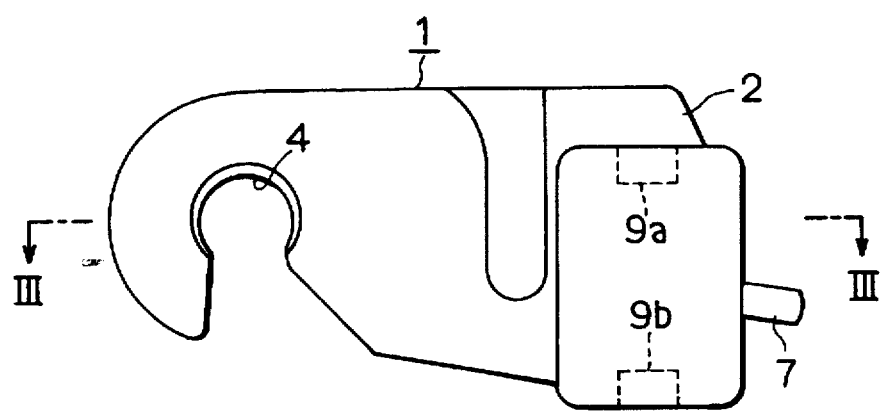
FIG. 2 is a side view of a clip according to a first embodiment of the present invention.

In FIG. 1 illustrating a windshield wiper W, the wiper W includes an arm piece A and a wiper blade B. Wiper blade B contains a blade joint member J which is joined rotatably to arm piece A via a clip 1 and a rivet R.

Figure 3:
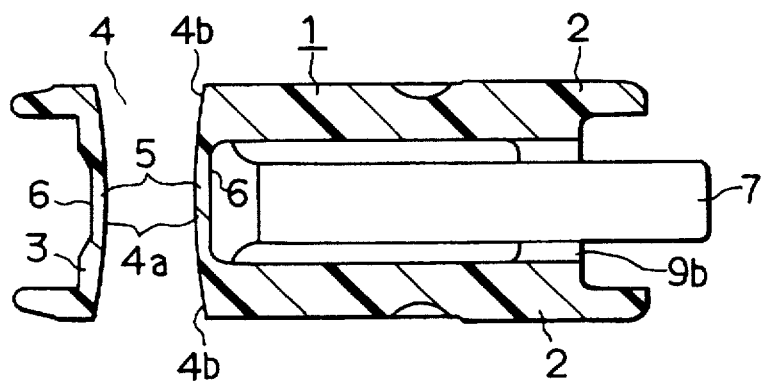
FIG. 3 is a cross-sectional view of the clip taken along a line III—III in FIG. 2.
Figure 4:
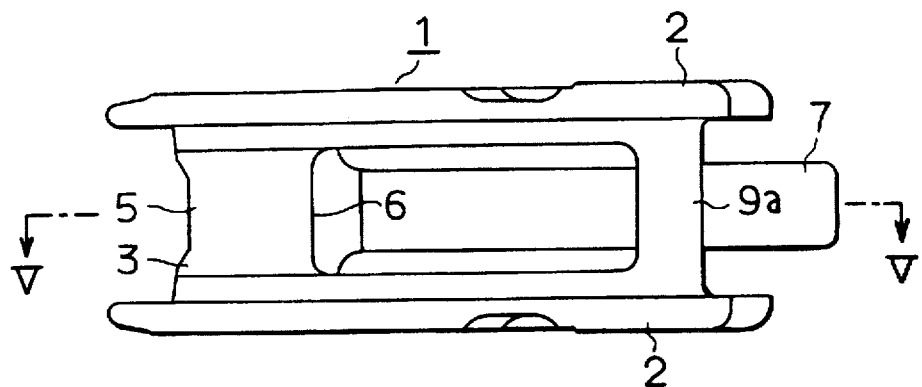
FIG. 4 is a plan view of the clip according to the first embodiment.
Figure 5:
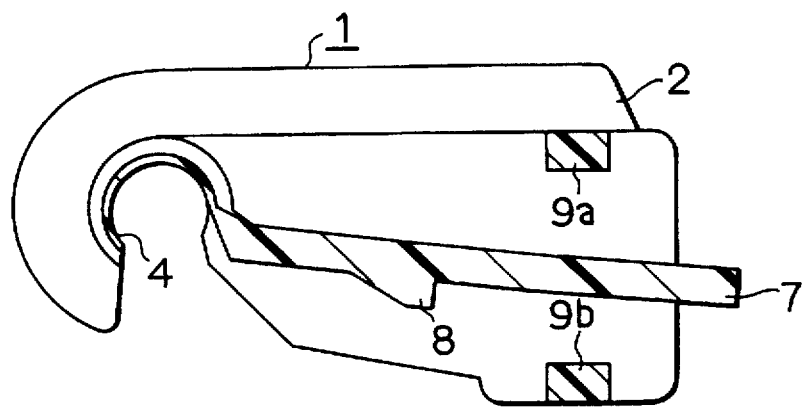
FIG. 5 is a cross-sectional view taken along a line V—V in FIG. 4.
Figure 6:
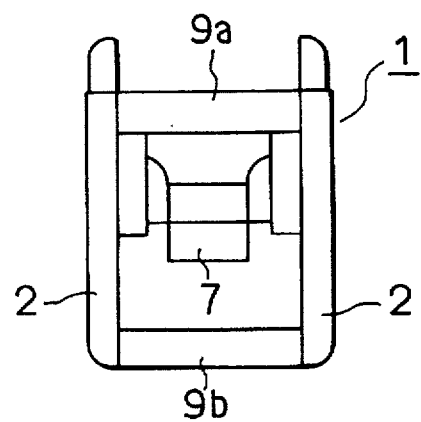
FIG. 6 is a bottom side view illustrating the clip according to the first embodiment.

As illustrated in FIGS. 2 through 6, clip 1 of synthetic resin includes a pair of side plates 2 and a connecting bar 3 connecting these side plates 2. As illustrated in FIG. 3, connecting bar 3 has a substantially cylindrical penetrating hole 4 penetrating through clip 1 in its width direction. A part of penetrating hole 4 is open along the width of clip 1. An inner diameter of penetration hole 4 is formed in a tapered configuration; smallest at a middle portion 4a and largest at open edge portions 4b. This configuration of penetration hole 4 is due to restrictions on shapes of molding die for injection molding. That is, to take out a molded product easily, a convex portion of the molding die for forming the molded product has a tapered configuration so that a parting line (a line contained in the plane at which two dies interface) of the molded product (in this case, the middle portion 6a of penetration hole 4) is provided at the narrowest position. The maximum diameter of penetrating hole 4, which is the diameter at edge portion 4b is made substantially equal to the diameter of a rivet R to be inserted into penetration hole 4. As illustrated in FIG. 3, connecting bar 3 has a thinned portion 5 at a middle portion thereof. Thinned portion 5 is formed by providing a recessed portion 6 at a radially outer periphery of the middle portion of connecting bar 3. Connecting bar 3 includes an arm piece fixing portion 7 formed to extend integrally from the middle portion. As illustrated in FIG. 5, arm piece fixing portion 7 has a protrusion 8 for engagement with a concave portion formed at a pointed end of the arm piece A. An upper supporting bar 9a is formed between a pair of side plates 2 slightly inside of the upper edge portions of the side plates 2 at a position opposite to the connecting bar 3. A lower supporting bar 9b is formed in the same way between the pair of side plates 2 slightly inside of the lower edge portions of the side plates 2. Thus, as shown in FIG. 6, both supporting bars 9a and 9b connects both side plates 2 and are of the same length.

Figure 7:
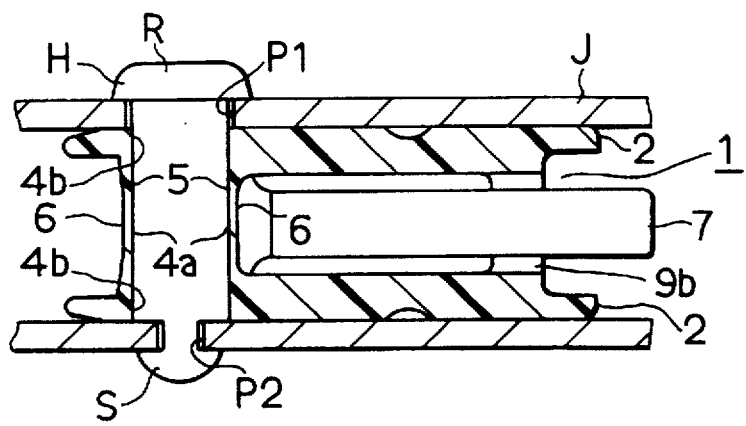
FIG. 7 is a cross-sectional view of the clip after attachment.

Next a process of joining wiper blade B to arm piece A using clip 1 will now be described. As illustrated in FIG. 7, clip 1 is inserted in a manner that penetration hole 4 of clip 1 is aligned with holes P1 and P2 provided in joint member J. Then, rivet R is inserted into holes P1 and penetration hole 4. The diameter of rivet R is equivalent to the diameter of edge portion 4b of penetrating hole 4 and larger than the diameter of middle portion 4a. However, as thinned portion 5 of connecting bar 3 is pressed radially outwardly by rivet R and elastically deformed, rivet R can be pressed into the inner wall of penetration hole 4. By this deformation, as illustrated in FIG. 7, the outer diameter of rivet R becomes identical to the diameter of penetration hole 4. Rivet R is inserted until its head H reaches blade joint member J. A caulking portion S formed at the tip of rivet R is projected through a hole P2 of blade joint member J. By flattening caulking portion S, clip 1 fixed to rivet R and is rotatably supported by rivet R with respect to blade joint member J. Next, a U-shaped tip (not shown) of arm piece A is engaged with an engaging hole (not shown) formed thereat with protruding portion 8 formed at clip 1, so that arm piece A is fixed to clip 1. Therefore, blade B is rotatably installed relative to arm piece A. Clip 1 is capable of slidably contacting blade joint member J.

The followings are characteristics of the present embodiment.

(1) According to the present embodiment, thinned portion 5 is formed by providing recessed portion 6 at a radially outer periphery around the middle portion of connecting bar 3.

For this reason, wobble which will unavoidably be caused due to the molding die shape can be cancelled. That is, by joining clip 1 to blade joint member J which is a part of blade B using rivet R having the same outer diameter as the maximum diameter (diameters at both end portions 4b) of penetrating hole 4, no clearance will be made between penetration hole 4 and rivet R because thinned portion 5 is elastically deformed in outerward. Therefore, the wobble between clip 1 and blade joint member J is restrained. In addition, since the deformed thinned portion 5 stresses on rivet R, the wobble can be sufficiently restrained even if the parting line of clip 1 has any dislocation which will be caused when two molding dies are dislocatedly mated at injection molding.

(2) Two supporting bars 9a and 9b are formed at upper and lower portions of the side plates at positions opposite to connecting bar 3 respectively. For this reason, clip 1 can be manufactured without being affected by resin shrinkage which occurs after molding. That is, both supporting bars 9a and 9b prevent width reduction due to the resin shrinkage of clip 1, thereby restraining the occurrence of clearance between side plates 2 of clip 1 and blade joint member J. Therefore, the wobble between clip 1 and blade joint member J is restrained.

(SECOND EMBODIMENT)

Figure 8:
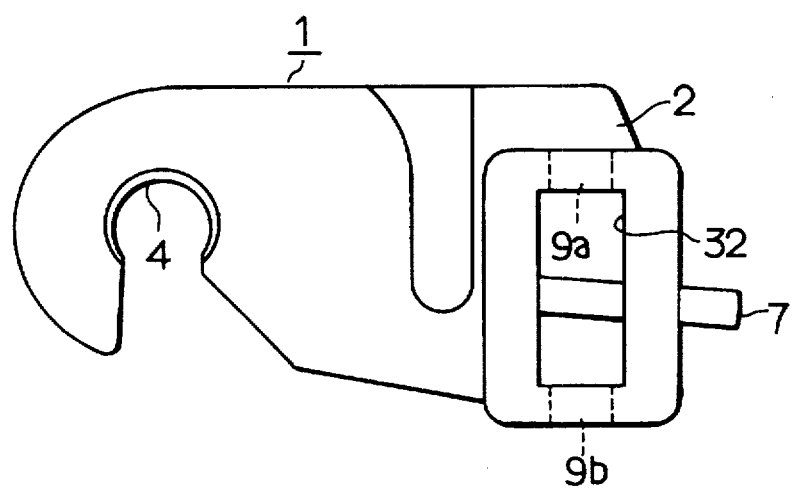
FIG. 8 is a side view of a clip according to a second embodiment of the present invention.

Next, a second embodiment according to the present invention will be described with reference to FIG. 8 in which the same reference numerals for the same components or the same functions are used. Clip 1 is identical to clip of the first embodiment except for the following points. At both side plates 2, a window 32 is formed between supporting bars 9a and 9b. Window 32 is formed in the lengthwise direction. Window 32 is formed so that an upper end and a lower end of window 32 are flush with upper supporting bar 9a and lower supporting bar 9b respectively.

In addition to the characteristics of clip 1 according to the first embodiment, clip 1 of the second embodiment includes further characteristics as follows. As window 32 is provided, no additional molding die is necessary for forming lower supporting bar 9b. It is because the die for forming side plates 2 can be modified in shape to form also lower supporting bar 9b. That is, the shape of molding die can be extended through window 32. Accordingly, it is unnecessary to add a separate molding die which is necessitated according to the first embodiment for forming lower supporting bar 9b at the rear of clip 1.

The present invention having been described above is not limited to the disclosed embodiments but may be modified further without departing from the spirit and scope of the invention as follows.

Figure 9:
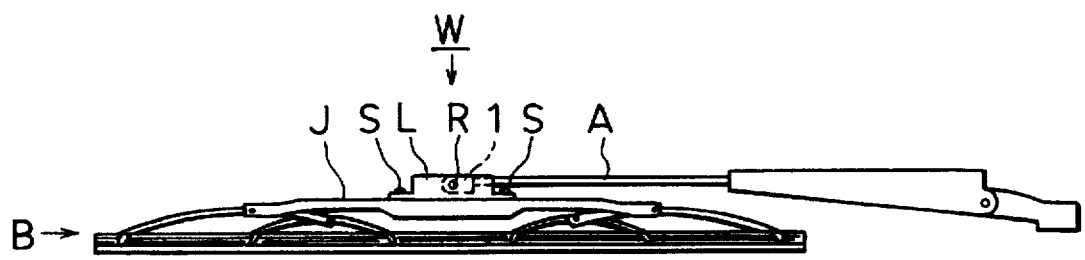
FIG. 9 is a side view of a clip according to a modified embodiment of the present invention.
Figure 10:
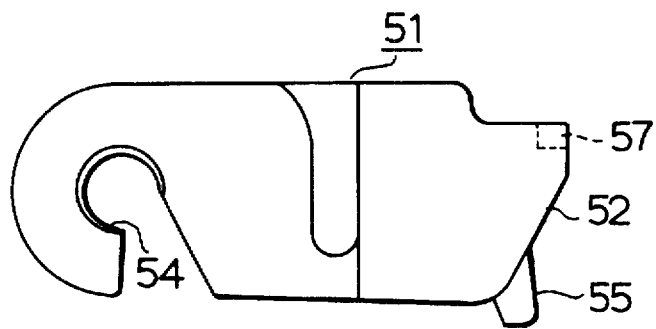
FIG. 10 is a side view of a conventional clip.
Figure 11:
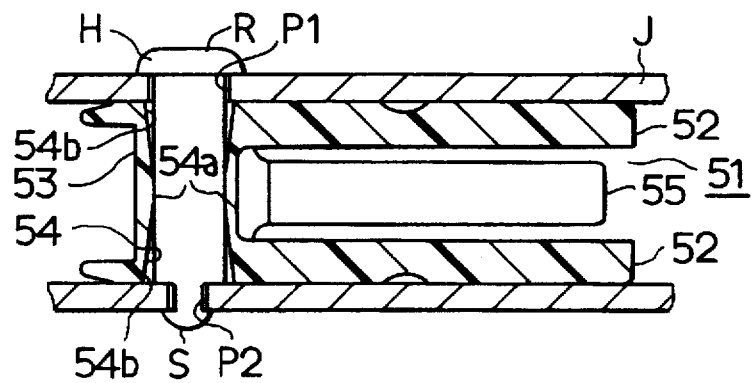
FIG. 11 is a cross-sectional view of the conventional clip after attachment.
Figure 12:
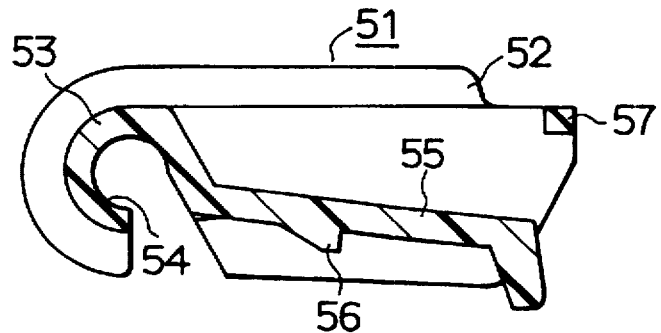
FIG. 12 is a side sectional view of the conventional clip.
Figure 13:
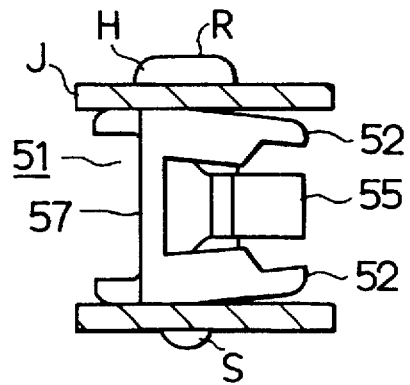
FIG. 13 is a bottom view illustrating the conventional clip after attachment.

(1) Instead of attaching clip 1 to joint member J, forming a part of blade B to be rotatable around rivet R, clip 1 can be installed to a holder L as shown in FIG. 9, which is a part of blade B and fixed to blade joint member J by screws S, pivotably around rivet R.

(2) The number of supporting bars may be three or more of supporting bars.

As mentioned above, the present invention can provide a clip for a windshield wiper blade which restrains occurrence of wobble relative to an arm piece of the windshield wiper blade.

The present invention having been described above should not be limited to the foregoing embodiments but may be modified in many other ways without departing from the spirit and scope of the invention.

I claim:

1. A clip for a windshield wiper blade, comprising:
   a pair of side plates made of resin; and
   a connecting bar made of resin and connecting said side plates, said connecting bar having a penetration hole penetrating therethrough in a width direction for receiving a rivet therethrough, the penetration hole having opposite open end portions and a middle portion, wherein:
      said penetration hole has at the middle portion a diameter smaller than a diameter at both open end portions, the diameter of the penetration hole at both open end portions corresponding to an outside diameter of said rivet; and
      said connecting bar having a portion that is thinned at a radial outside of said middle portion relative to adjacent portions of the connecting bar, the thinned portion of the connecting bar being elastically deformable upon insertion of the rivet into the penetration hole so that the diameter of said penetration hole conforms to said outside diameter of said rivet throughout the width of said connecting bar when said rivet is inserted into the penetration hole.

2. A clip for a windshield wiper blade, comprising:
   a pair of side plates made of resin, said side plates each having longitudinally spaced first and second ends;
   a connecting bar made of resin and connecting said side plates, said connecting bar being positioned adjacent said first ends of said side plates, said connecting bar having a penetration hole penetrating therethrough in a width direction for receiving a rivet therethrough;
   a plurality of supporting bars extending in parallel with said connecting bar and connecting said side plates at a position different from said connecting bar, said supporting bars being positioned adjacent said second ends of said side plates, said supporting bars being provided at upper and lower portions of said side plates; and an arm piece fixing portion integrally formed with said connecting bar and extending away from said connecting bar between said side plates and between said supporting bars.

3. A clip for a windshield wiper blade according to claim 2, wherein:
   a window is provided between said supporting bars.

4. A clip for a windshield wiper blade, comprising:
   a pair of side plates;
   a connecting bar connecting said side plates, said connecting bar having a penetration hole penetrating therethrough in a width direction for receiving a rivet therethrough, the penetration hole having opposite open end portions and a middle portion; and
   a plurality of supporting bars extending in parallel with said connecting bar and connecting said side plates at a position different from said connecting bar, wherein:
      said penetration hole has at the middle portion a diameter smaller than a diameter at both open end portions, the diameter of the penetration hole at both open end portions corresponding to an outside diameter of the rivet; and
      said connecting bar has a portion that is thinned at a radial outside of said middle portion relative to adjacent portions of the connecting bar, the thinned portion of the connecting bar being elastically deformable upon insertion of the rivet into the penetration hole so that the diameter of said penetration hole conforms to said outside diameter of said rivet throughout the width of said connecting bar when said rivet is inserted into the penetration hole.

5. A clip for a windshield wiper blade, comprising:
   a pair of side plates;
   a connecting bar connecting said side plates, said connecting bar having a penetration hole penetrating therethrough in a width direction for receiving a rivet therethrough, the penetration hole having a middle portion and opposite open end portions; and
   a plurality of supporting bars extending in parallel with said connecting bar and connecting said side plates at a position different from said connecting bar, said supporting bars being provided at upper and lower portions of said side plates, wherein:
      said penetration hole has at the middle portion a diameter smaller than a diameter at both open end portions, the diameter of the penetration hole at both open end portions corresponding to an outside diameter of the rivet; and
      said connecting bar has a portion that is thinned at a radial outside of said middle portion relative to adjacent portions of the connecting bar so that the diameter of said penetration hole conforms to the outside diameter of the rivet throughout the width of said connecting bar when the rivet is inserted into the penetration hole.

6. A clip for a windshield wiper blade according to claim 5, wherein the side plates each have longitudinally spaced first and second ends, the connecting bar being positioned adjacent the first ends of the side plates, the supporting bars being positioned adjacent the second ends of the side plates.

7. A clip for windshield wiper blade, comprising:

a pair of side plates made of resin; and a connecting bar made of resin and connecting said side plates, said connecting bar having a penetration hole penetrating therethrough in a width direction for receiving a rivet therethrough, the penetration hole having opposite open end portions and a middle portion, wherein:

said penetration hole has at the middle portion a diameter smaller than a diameter at both open end portions, the diameter of the penetration hole at both open end portions corresponding to an outside diameter of the rivet; and said connecting bar has a deformable portion at a radial outside of said middle portion so that the diameter of said penetration hole conforms to the outside diameter of the rivet throughout the width of said connecting bar when the rivet is inserted into the penetration hole.

8. A clip for a windshield wiper blade according to claim 7, wherein the side plates each have longitudinally spaced first and second ends, the connecting bar being positioned adjacent the first ends of the side plates, the supporting bars being positioned adjacent the second ends of the side plates.

* * * * *